(12) United States Patent
Ortega et al.

(10) Patent No.: US 9,721,686 B2
(45) Date of Patent: Aug. 1, 2017

(54) HANDOFF METHODS AND ASSEMBLIES FOR REFUELING A NUCLEAR REACTOR

(75) Inventors: Frank Ortega, San Jose, CA (US); Mark William Broaddus, Rohnert Park, CA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 1472 days.

(21) Appl. No.: 11/618,439

(22) Filed: Dec. 29, 2006

(65) Prior Publication Data
US 2008/0159463 A1    Jul. 3, 2008

(51) Int. Cl.
G21C 19/07    (2006.01)
G21C 19/11    (2006.01)
(Continued)

(52) U.S. Cl.
CPC ............ G21C 19/11 (2013.01); G21C 19/18 (2013.01); G21C 19/20 (2013.01);
(Continued)

(58) Field of Classification Search
CPC ........ G21C 19/11; G21C 19/18; G21C 19/20; G21Y 2002/201; G21Y 2002/202; G21Y 2004/30; G21Y 2004/40
(Continued)

(56) References Cited

U.S. PATENT DOCUMENTS 4,427,623 A * 1/1984 Howard et al. ............... 376/263
4,713,212 A * 12/1987 Plumier ......................... 376/258
(Continued)

FOREIGN PATENT DOCUMENTS

JP    54-099894    8/1979
JP    57-61992 A   4/1982
(Continued)

OTHER PUBLICATIONS

U.S. Nuclear Regulatory Commission Information Notice 94-13: "Unanticipated and Unintended Movement of Fuel Assemblies and other components Due to Improper Operation of Refueling Equipment", Feb. 22, 1994, 4 pages.
(Continued)

*Primary Examiner* — Timothy A Brainard
(74) *Attorney, Agent, or Firm* — Harness, Dickey & Pierce PLC

(57) ABSTRACT

Systems and methods for refueling a nuclear reactor that has a reactor core in a reactor pool having a plurality of elongated reactor core components, a fuel pool for storing core components, and a transfer channel connecting the fuel pool to the reactor pool. The method includes retrieving a replacement core component from the fuel pool, and securing the replacement core component in a first compartment of a handover assembly in a vertical position. The method also includes retrieving a spent core component from the reactor core, and securing the spent core component in a second compartment of the handover assembly in a vertical position. The replacement core component is retrieved from the first compartment and installed into the reactor core. The spent core component is retrieved from the second compartment and stored in a storage rack in the fuel pool.

19 Claims, 7 Drawing Sheets

(51) Int. Cl.
*G21C 19/18* (2006.01)
*G21C 19/20* (2006.01)

(52) U.S. Cl.
CPC .. *G21Y 2002/201* (2013.01); *G21Y 2002/202* (2013.01); *G21Y 2004/30* (2013.01); *G21Y 2004/40* (2013.01)

(58) Field of Classification Search
USPC .................. 376/268, 293; 342/268, 269, 293
See application file for complete search history.

(56) References Cited

U.S. PATENT DOCUMENTS

| | | | |
|---|---|---|---|
| 5,019,327 A | | 5/1991 | Fanning et al. |
| 5,291,532 A | * | 3/1994 | Townsend ............... G21C 19/18 376/268 |
| 5,377,240 A | * | 12/1994 | Mallie ............................ 376/264 |
| 5,473,645 A | * | 12/1995 | Kowdley ...................... 376/272 |
| 5,644,607 A | * | 7/1997 | Iwama et al. .................. 376/268 |
| 5,687,207 A | | 11/1997 | Meuschke et al. |
| 5,896,430 A | * | 4/1999 | Baversten .............. G21C 19/20 376/262 |
| 5,930,318 A | | 7/1999 | Baversten et al. |
| 6,359,953 B1 | | 3/2002 | Faser et al. |

FOREIGN PATENT DOCUMENTS

| | | |
|---|---|---|
| JP | 57-61993 A | 4/1982 |
| JP | 57-61994 A | 4/1982 |
| JP | 7-12985 A | 1/1995 |

OTHER PUBLICATIONS

Advances in Nuclear Fuel Management III, "Reducing Refueling Outage Duration by Optimizing Core Design and Shuffling Sequence," P. H. Wakker et al., Oct. 5-8, 2003.

Office Action issued in connection with JP Application No. 2007-322676, Feb. 5, 2013.

* cited by examiner

HANDOFF METHODS AND ASSEMBLIES FOR REFUELING A NUCLEAR REACTOR

FIELD

The present disclosure relates to refueling nuclear reactors and more specifically, to the use of refueling assemblies with a nuclear reactor that reduce the time for refueling operations and the downtime of electricity generation for a nuclear power plant.

BACKGROUND

The statements in this section merely provide background information related to the present disclosure and may not constitute prior art.

In a nuclear reactor such as a pressurized water reactor (PWR) or a boiling water reactor (BWR), a reactor core is contained in a pressure vessel. The core includes a plurality of transversely spaced apart elongate nuclear fuel bundles and control rods. Each of the fuel bundles includes an outer fuel or flow channel typically having a square transverse section. Elongate fuel tubes spaced apart in a conventional matrix are disposed within the flow channel. The bottom of the fuel bundle typically includes a hollow, conical nosepiece or lower tie plate through which water is channeled upwardly through the fuel bundle wherein it is heated by conventional nuclear reactions within the fuel tubes. The top of the fuel bundle is open to allow water and steam to escape. A handle is typically provided for lifting the fuel bundle into or from its position within the reactor core for fuel bundle loading or unloading.

During a typical core refueling operation, 25% or more of spent or burned fuel bundles within the reactor core are replaced with new unused fuel bundles. An upper pool of water is typically located above the reactor core for providing, for example, shielding of radiation from the fuel bundles, and a conventional bridge or gantry is movable over the pool for refueling the reactor core. The bridge includes a trolley mounted grapple which is telescopically extended downwardly through the pool and into the reactor core to grab one of the fuel bundles by its handle at the top thereof, and is then retracted upwardly to remove the fuel bundle. The fuel bundle is continuously maintained under the water to provide shielding thereof as well as for allowing water to flow upwardly through the fuel bundle to cool it. This prevents overheating due to the continuation of nuclear reactions therein which occur at a substantially reduced level than that occurring in an operating reactor core.

In a one bridge refueling system, each fuel bundle, or spent fuel bundle, is removed from the core and is translated one at a time horizontally through the upper pool to an adjacent fuel storage pool and placed vertically in a horizontal array of storage racks to be temporarily stored for up to several years until such spent fuel is then relocated to a long term storage site. A fresh fuel bundle is then transported by the bridge from the fuel storage pool back to the reactor core and positioned therein. Since a typical reactor includes several hundred fuel bundles, a substantial amount of time is required to remove the spent fuel bundles and replace them with fresh fuel bundles.

Furthermore, in a single bridge system, conventional fuel shipping casks can weigh up to about 100 tons. This fuel shipping cask must be individually lifted into the fuel storage pool so that the spent fuel may be inserted therein. The lifting of such a heavy cask involves a risk that the cask may drop and damage the pool and/or the fuel bundles.

Another type of refueling system used in many PWRs and some BWRs uses two bridges with a transfer machine located between the two. One bridge carries fresh and spent fuel bundles individually between the reactor core and the transfer machine, and the other bridge transports spent and fresh fuel bundles between the transfer machine, and the fuel storage pool. The transfer machine then conveys the spent and fresh fuel bundles between the two bridges. In this way, an entire refueling operation may be carried out in less time than using a single bridge since the two bridges and transfer machine may be synchronized with all operating contemporaneously, with each separately carrying a respective fuel bundle therebetween. This system also eliminates the risk of dropping a shipping cask in the storage pool since one of the bridges may be used for transporting fuel between separate pools containing the stored fuel and the shipping casks.

In this two bridge system, the two bridges are typically located in separate buildings, one containing the reactor core, and another containing the fuel storage pool. The common wall between the two buildings must necessarily provide a seal for radiation and pressure between the two buildings and therefore requires a relatively complex transfer tube extending therebetween through which fuel bundles are transferred. The transfer tube is typically oriented either horizontally or inclined so that the passage between the two buildings is relatively small for reducing the complexity of the required seals therebetween. It is desirable to transport the fuel bundles primarily in an upright vertical orientation as they are moved laterally or sideways through the respective pools so that water may continually flow vertically upwardly therethrough for cooling the fuel bundles. The fuel bundles must, therefore, necessarily be temporarily upended or moved from their vertical orientation to the inclined or horizontal orientation for passage through the transfer tube. The conventional transfer machine therefore provides an upending device at each end of the transfer tube to initially rotate a vertical fuel bundle in the required horizontal inclination for passage through the transfer tube, and at the other end thereof another upending device then returns the fuel bundle to the preferred vertical orientation. Suitable seals are provided at both ends of the transfer tube to prevent leakage of the water therethrough.

Since spent fuel bundles have been operating for a considerable amount of time in the reactor core, radioactive corrosion debris is formed within the fuel bundles which is typically broken loose during the transport thereof and falls to the bottom of the respective pools. The radioactive corrosion debris will also fall during the upending operations and during travel through the transfer tube. The radioactive corrosion debris must be cleaned up from time to time which increases the maintenance time and cost in view of the complex transport path required with the two bridge and transfer tube system.

Furthermore, when the fuel bundles are inclined horizontally, natural convection cooling by the water being channeled therethrough is reduced since the vertical path therethrough has been reduced or eliminated. Accordingly, the fuel bundle must be transported relatively quickly through the transfer tube to reduce the likelihood of overheating of the fuel bundles, and additional procedures must be established to provide effective cooling thereof in the event of any failure of the transfer machine while the fuel bundles are upended.

SUMMARY

The inventors hereof have succeeded at designing refueling assemblies that are capable of efficiently replacing spent core components of the reactor core of a nuclear reactor with replacement components during refueling operations while maintaining the fuel rods in the vertical position and without requiring the fuel rods to be placed in a horizontal position. Such a system further provides for opportunities for refueling operations to be simultaneously carried out in both the fuel pool and the core pool, and provides for an efficient and safe handover of spent core components and replacement components that can reduce reactor outages associated with refueling.

According to one aspect, an assembly for refueling a nuclear reactor that has elongated core components positioned in a reactor pool, a fuel pool, and a transfer pool fluidly coupling the fuel pool to the reactor pool. The system includes a handover assembly that is selectively positionable within the transfer channel. The handover assembly includes two or more compartments that are each configured to selectively secure one of the core components in a vertical position. The handover assembly is movable to allow independent selective access to each compartment by a reactor pool grapple operating from a reactor pool bridge and by a fuel pool grapple operating from a fuel pool bridge.

According to another aspect, an assembly for refueling a nuclear reactor having a reactor core in a reactor pool through a transfer channel to a storage rack in a fuel pool includes a handover assembly, a reactor pool bridge, and a fuel pool bridge.

The handover assembly includes two or more compartments that are each configured to selectively secure at least one component of the core in a vertical position. The handover assembly is configured to be positionable within the transfer channel. The reactor pool bridge is positioned above and movable over the reactor pool. The reactor pool bridge includes a reactor pool transfer assembly that has a reactor pool grapple that is configured to engage a spent core component from the core and transfer the spent core component to one of the handover assembly compartments. The fuel pool bridge is positioned above and movable over the fuel pool. The fuel pool bridge includes a fuel pool transfer assembly that has a fuel pool grapple configured to engage a replacement core component within the fuel pool and transfer the replacement core component from the fuel pool to one of the compartments of the handover assembly. A trolley is movable along the fuel pool bridge. The handover assembly is rotatably coupled beneath the trolley. The trolley includes an extension assembly configured to extend the handover assembly from the fuel pool bridge and the trolley and into the transfer channel.

According to yet another aspect, an assembly for refueling nuclear reactor includes means for transferring one or more elongated core components between a reactor core pool and a fuel pool through a transfer channel in a vertical position. The means for transferring core components includes two or more compartments for temporarily securing two different core components, each in a vertical position. Also included is means for moving at least one of the core components within the reactor core pool to deliver and retrieve the at least one core component from at least one of the compartments of the means for transferring. The assembly also includes means for moving at least one of the core components within the fuel pool to deliver and retrieve the at least one core component from at least one of the compartments of the means for transferring.

According to still another aspect, a method of refueling a nuclear reactor having a reactor core in a reactor pool having a plurality of elongated reactor core components, a fuel pool for storing core components, and a transfer channel that connects the fuel pool to the reactor pool. The method includes retrieving a replacement core component from the fuel pool, and securing the replacement core component in a first compartment of a handover assembly in a vertical position. The method also includes retrieving a spent core component from the reactor core, and securing the spent core component in a second compartment of the handover assembly in a vertical position. The replacement core component is retrieved from the first compartment and installed into the reactor core. The spent core component is retrieved from the second compartment and stored in a storage rack in the fuel pool.

Further aspects of the present invention will be in part apparent and in part pointed out below. It should be understood that various aspects of the disclosure may be implemented individually or in combination with one another. It should also be understood that the detailed description and drawings, while indicating certain exemplary embodiments, are intended for purposes of illustration only and should not be construed as limiting the scope of the disclosure.

BRIEF DESCRIPTION OF THE DRAWINGS

It should be understood that throughout the drawings, corresponding reference numerals indicate like or corresponding parts and features.

DETAILED DESCRIPTION

Figure 1:
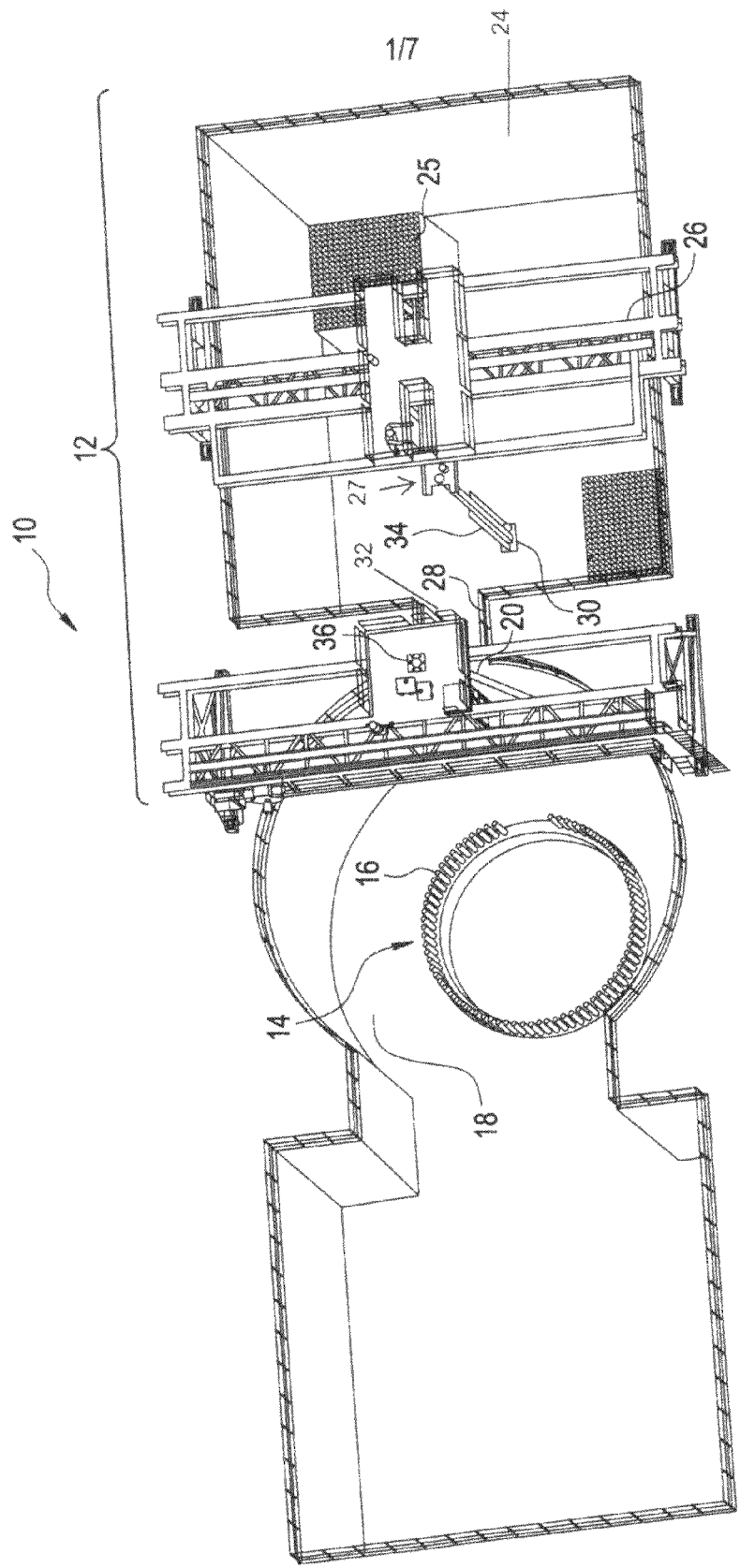
FIG. 1 is a perspective view of a nuclear reactor facility with the refueling infrastructure according to one exemplary embodiment.

The following description is merely exemplary in nature and is not intended to limit the present disclosure or the disclosure's applications or uses.

In some embodiments, assemblies and methods for refueling a nuclear reactor include retrieving a replacement core component from the fuel pool, and securing the replacement core component in a first compartment of a handover assembly in a vertical position. The method also includes retrieving a spent core component from the reactor core, and securing the spent core component in a second compartment of the handover assembly in a vertical position. The replacement core component is retrieved from the first compartment and installed into the reactor core. The spent core component is retrieved from the second compartment and stored in a storage rack in the fuel pool.

In these methods and processes, the handover assembly can provide for transferring the components between the reactor pool and the fuel pool through the transfer pool while always maintaining the core components in a vertical position and for one or more simultaneous operations that can expedite refueling operations and reduce refueling intervals.

In some embodiments, an assembly for refueling a nuclear reactor that has reactor core with elongated core components positioned in a reactor pool, a fuel pool, and a transfer pool fluidly coupling the fuel pool to the reactor pool. The system includes a handover assembly that is selectively positionable within the transfer channel. The handover assembly includes two or more compartments that are each configured to selectively secure one of the core components in a vertical position. For example, the compartments can be configured for receiving and securing a fuel assembly, a control rod, a control rod tube, or a double blade guide. For example, in one exemplary embodiment, the handover assembly includes a first compartment for securing a first fuel assembly and a second compartment for securing a second fuel assembly. The first and second compartments can be positioned on a first side of the handover assembly. The handover assembly can also include one or more third compartments positioned on a second side substantially opposing the first side. These third compartments can be configured to receive and secure a fuel assembly or a double blade guide, a control rod, and a control rod tube, which is the same or different than the first and second compartments. The handover assembly can be rotatable to allow the independent selective access to each of the first, second and third compartments by the fuel pool grapple and the reactor pool grapple.

The handover assembly is movable to allow independent selective access to each compartment by a reactor pool grapple operating from a reactor pool bridge and by a fuel pool grapple operating from a fuel pool bridge. In some exemplary embodiments, a trolley is movably coupled about a portion of the fuel pool bridge, such as on an underside. As the fuel pool bridge moves in one direction, the trolley can move in a perpendicular direction so that 100 percent of the fuel pool can be accessed. In one embodiment, the handover assembly includes a mast coupled to the trolley that can extend downward via an extension assembly and into the fuel pool to retrieve or place a core component with the fuel pool. In such an embodiment, the compartments of the handover assembly can be positioned about the mast, such as on exterior portions or positioned at a distance from the center axis of the mast.

A lifting assembly such as a motor and pulley or a separate extendable mast can be configured to raise and lower the fuel pool grapple within the fuel pool and to access the compartments for transferring core components. For example, a hoist and a cable can be coupled to the fuel pool grapple and operable from the fuel pool bridge to raise and lower the fuel pool grapple and access each of the compartments, the fuel pool grapple being configured to temporarily secure a component and install and retrieve components from each of the compartments.

The trolley can also include an extension assembly that allows for extending the handover assembly from the fuel pool bridge or at least from underneath the fuel pool bridge and into the transfer channel. In this manner, the fuel pool bridge remains above the fuel pool and the trolley extends the extension assembly into the transfer pool wherein the handover assembly and its compartments enter into the transfer pool. The handover assembly can include a retrieved replacement core component that is positioned in a compartment for transfer in the transfer pool, or one or more compartments can be empty to receive a spent core component.

Alternatively, the mast with the compartments attached thereto can be rotatably coupled in a fixed position about a lower portion of the fuel pool bridge and extending downward. In such embodiments, the mast and compartments can be substantially aligned with the transfer channel and dimensioned to enable at least a 90 degree, a 180 degree rotation or a full 360 degree rotation of the mast and the position of the fuel assembly and the compartments within the transfer channel.

The handover assembly, the mast, the grapple, the extension assembly and the trolley can each be controlled from a remote control unit and or by an operator. Additionally, one or more position locks or controls can be implemented in software or via feedback position signals to ensure that the handover assembly only enters the transfer pool with an empty compartment positioned in the direction of the reactor pool.

In some embodiments, the handover assembly can include an elongated body extending downward and defining the at least two compartments each having an elongated shape. Each of the compartments can have at least one substantially open side for allowing the lateral passage of a component into and out of the compartment. A latch can be positioned on the handover assembly and associated with one or more compartments for selectively securing a core component vertically within the compartment and preventing the lateral movement of the core component therein. In some embodiments, each compartment can include a bottom aperture and a bottom plate movable to selectively close the bottom aperture. The bottom plate can be configured to hold the core component vertically within the compartment. The bottom plate can also be movable to an open position to enable the core component to exit from the bottom aperture responsive to a remote command.

As noted, a handover assembly control system can be located on one of the bridges or remote from the reactor. The control system can be configured to control an operation of the handover assembly, one or both of the bridges, the trolley, and one or both of the grapples, among other elements or assemblies that are typically utilized for refueling. As also noted above, the control system can be configured to prevent a movement of the handover assembly through the transfer channel in a direction of the reactor pool when a leading compartment secures a core component. Of course other limitations or rules for movement can also be implemented to provide additional operational or safety considerations.

In another embodiment, a transfer channel bridge is positioned above the transfer channel. In such an embodiment, the handover assembly can be rotatably coupled beneath the transfer channel bridge. The transfer channel bridge can be substantially fixed in position during refueling and removable when not in use, such as by a separate overhead crane. In these embodiments, the handover assembly can have one or more compartments positioned in a carousel fashion, or can include only two compartments. Where only two compartments are provided, a first compartment can be positioned about 180 degrees and substantially apart from a second compartment thereby providing space diversity and separation from the compartments and any spent and replacement core components secured with the compartments.

In each of these exemplary embodiments, operations in the fuel pool can be performed simultaneously with operations in the reactor pool. An operator or operations system can be responsible for each independently, but can allow for synchronization and coordination where desired to aid in the secure and safe transfer of core elements. Additionally, where the handover assembly is positioned on a transfer pool bridge, a third operator and/or operations system can operate the handover assembly separate from the fuel pool operation and the reactor core operations. As with the other two, synchronization and coordination are also possible.

Referring now to FIG. 1, a nuclear reactor 10 suitable for some embodiments includes a refueling assembly 12 infrastructure used to refuel a reactor core. A reactor pool 18 of a reactor core 14 includes core components 16 that can include fuel assemblies, double blade control rods and/or control rod tubes. A reactor pool bridge 20 includes a reactor pool grapple 36 for accessing core components 16 and movably transferring one or more core components 16 to a fuel transfer channel 32 having a transfer pool 28 for transferring a core component to a handover assembly 30. The handover assembly 30 includes a plurality of compartments 34 that are each configured for receiving spent fuel core components from the reactor core 14 and transferring a replacement core component from a fuel pool 24 for access by a reactor pool grapple 36. The transfer pool 28 is fluidly coupled between the fuel pool 24 and the reactor pool 18.

The handover assembly 30 can be selectively positionable within transfer channel 32. The handover assembly 30 can have two or more compartments 34 that are each configured for selectively securing one of the core components 16 in a vertical position on the handover assembly 30. The handover assembly 30 is movable to allow independent selective access to each compartment 34 by the reactor pool grapple 36 operating from the reactor pool bridge 20 and by the fuel pool grapple 27 from the fuel pool bridge 26.

Figure 2:
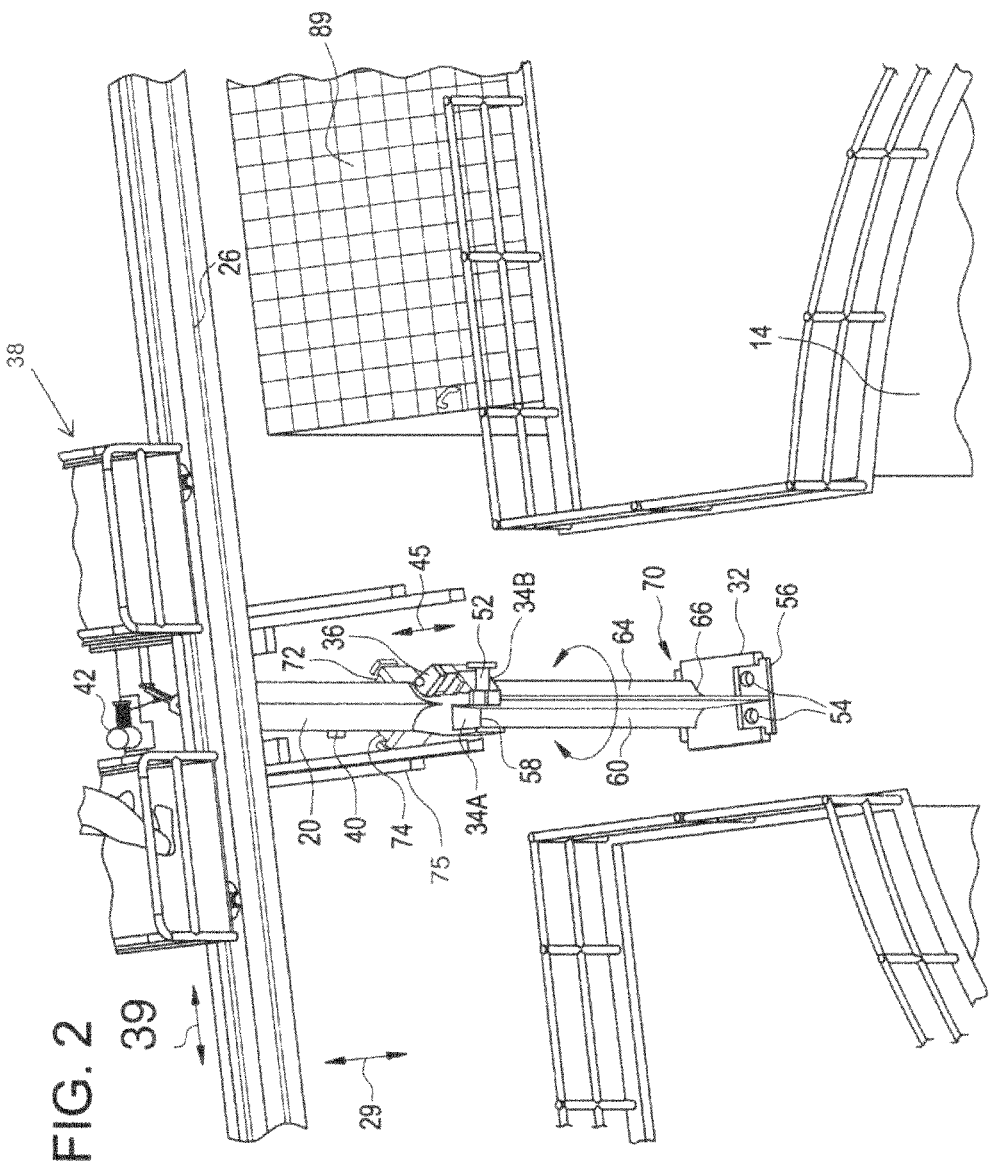
FIG. 2 is a partial perspective view of a handover assembly according to one exemplary embodiment.

Referring now to FIG. 2, additional structures of the fuel pool bridge 26, refueling assembly 12, and handover assembly 30 are shown. In this exemplary embodiment, a rotatable quiver for retaining core components 16 is shown. Handover assembly 30 includes a mast 40 coupled to trolley 38 extending downward with at least two compartments 34, compartments 34 being positioned about mast 40. A lifting assembly 42 can be configured to raise and lower the fuel pool grapple 27 (not shown). A trolley 38 positioned on the fuel pool bridge 26 can have an extension assembly 44 that facilitates extending the handover assembly 30 into the transfer channel 32 from the fuel pool and to provide selective access of the transferred components 16 by the reactor pool grapple 36 (not shown in FIG. 2).

A lifting assembly 42 has a hoist 46 and cable 48 for manipulating the fuel pool grapple 27. The hoist 46 and cable 48 can be coupled to the fuel pool grapple 27 and can be operable from the fuel pool bridge 26 to raise and lower the fuel pool grapple 27 and to access each of the compartments 34. The fuel pool grapple 27 can also be configured to temporarily secure a core component 16 and install and retrieve core components 16 from each of the compartments 34.

The fuel pool grapple 27 can be used to access core component 16, for example new fuel 25, which is stored within fuel pool 24. The fuel pool grapple 27 can also transfer the core component 16 to a handover assembly 30. The fuel pool grapple 27 can be used to access a spent core component 86 within the handover assembly 30 and store the spent core component 86 within the fuel pool 24.

Figure 3:
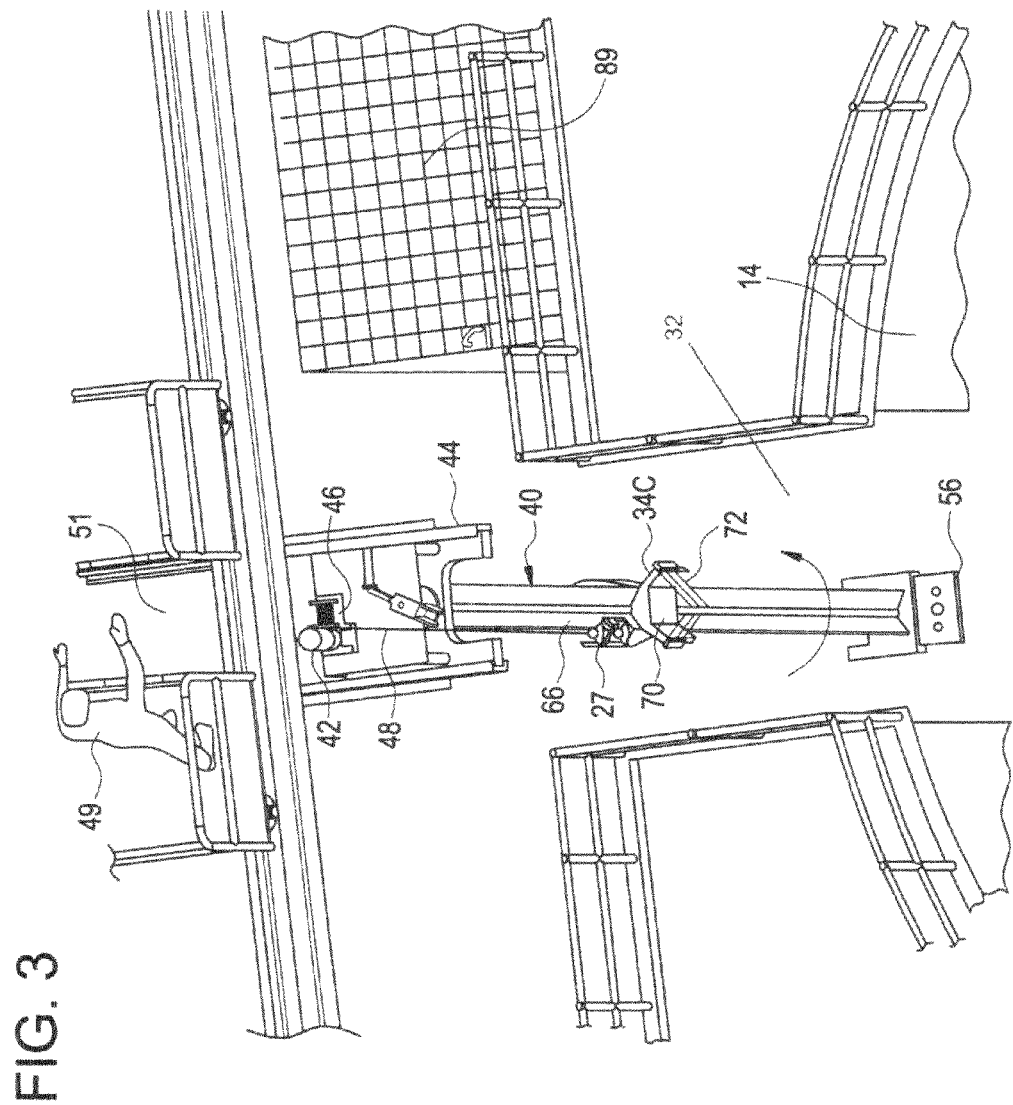
FIG. 3 is another perspective of the handover assembly of FIG. 2 with the mast rotated 180 degrees from that shown in FIG. 2 according to one exemplary embodiment.

Referring again to FIG. 2 and also to FIG. 3, the handover assembly 30 is shown having three compartments, 34A-C, also referred to as a first compartment 34A, a second compartment 34B and a third compartment 34C for transferring core components 16 between the reactor pool 18 and fuel pool 24 via the transfer channel 32.

The handover assembly 30 can include an elongated body extending downward and defining at least two compartments, each having an elongated shape, each compartment having at least one substantially open side for allowing lateral passage of a core component 16 into and out of compartment 34, and a latch 52 to selectively laterally secure the core component vertically positioned within compartment 34.

Each compartment 34 of the handover assembly 30 can include a movable bottom plate 56 that can selectively close a bottom aperture of each compartment 34. Each movable plate 56 can include a bottom aperture 54 configured for holding a core component 16 vertically within the compartment and can be movable to an open position to enable the core component 16 to exit from the bottom aperture of the compartment 34 in response to a remote command.

Each compartment 34 can have a latch 52, such as a rotary latch, for retaining a transferred core component 16 that has been inserted into one of the compartment 34 by a either the fuel pool grapple 27 and/or the reactor pool grapple 36. The trolley 38 movement 39 can be perpendicular to the fuel pool bridge movement 29, as shown in FIG. 2 and extension assembly movement 45 is parallel to the fuel bridge 24 movement and aligned with the transfer channel 32 in order to extend the handover assembly 30 into the transfer channel 32 for access by the reactor pool grapple 36 (not shown). As shown, the handover assembly 30 can be rotated to enable at least a 90 degree rotation of the mast via a control system 51 (as shown in FIG. 3). The handover assembly control system 51 can restrict the movement of the handover assembly 30 within the transfer channel 32 when a compartment 34 securing a core component 16 is positioned in a direction towards the reactor pool 18.

FIG. 3 shows the handover assembly 30 of FIG. 2 after a 180 degree rotation, wherein third compartment 34C is positioned for extension within transfer channel 32. Compartments 34A and 34B are on a first side 66 of handover assembly 30 and compartment 34C can be on a second side 70 of handover assembly 30. Movable plate 56 can be configured with bottom apertures 54 on a second side 70 of handover assembly 30 for receiving a double blade guide mount and faces the reactor core 14. The compartment 34C can be configured and dimensioned to receive and retain a double blade guide. An operator 49 can be positioned for manipulating the hoist 46 and cable 48 by utilizing lifting assembly 42 and control system 51 (not shown).

The reactor pool grapple 36 can be positioned to approach the handover assembly 30 to access core components in compartments 34A and 34B. Latches 52 are shown in their rotated positions, retaining a first fuel assembly 60 and a second fuel assembly 64. Fuel assembly 60 can be a spent core component 86 and second fuel assembly 64 can be new fuel 25. The handover assembly 30 can retain and transfer an inserted control rod 75 or a double blade guide 72. The double blade guide 72 can be retained on second side 70 of the handover assembly 30 and still be accessed by fuel pool grapple 27 located within fuel pool 24.

While the illustrated handover assembly embodiments show a handover assembly configured for three compartments, additional compartments can be included to rotatably accommodate the transfer of additional core components, depending upon the geometry of the core components and the physical dimensions of the transfer channel, as known to those skilled in the art. The illustrated embodiments are not intended to limit the scope of the disclosure.

Figure 4:
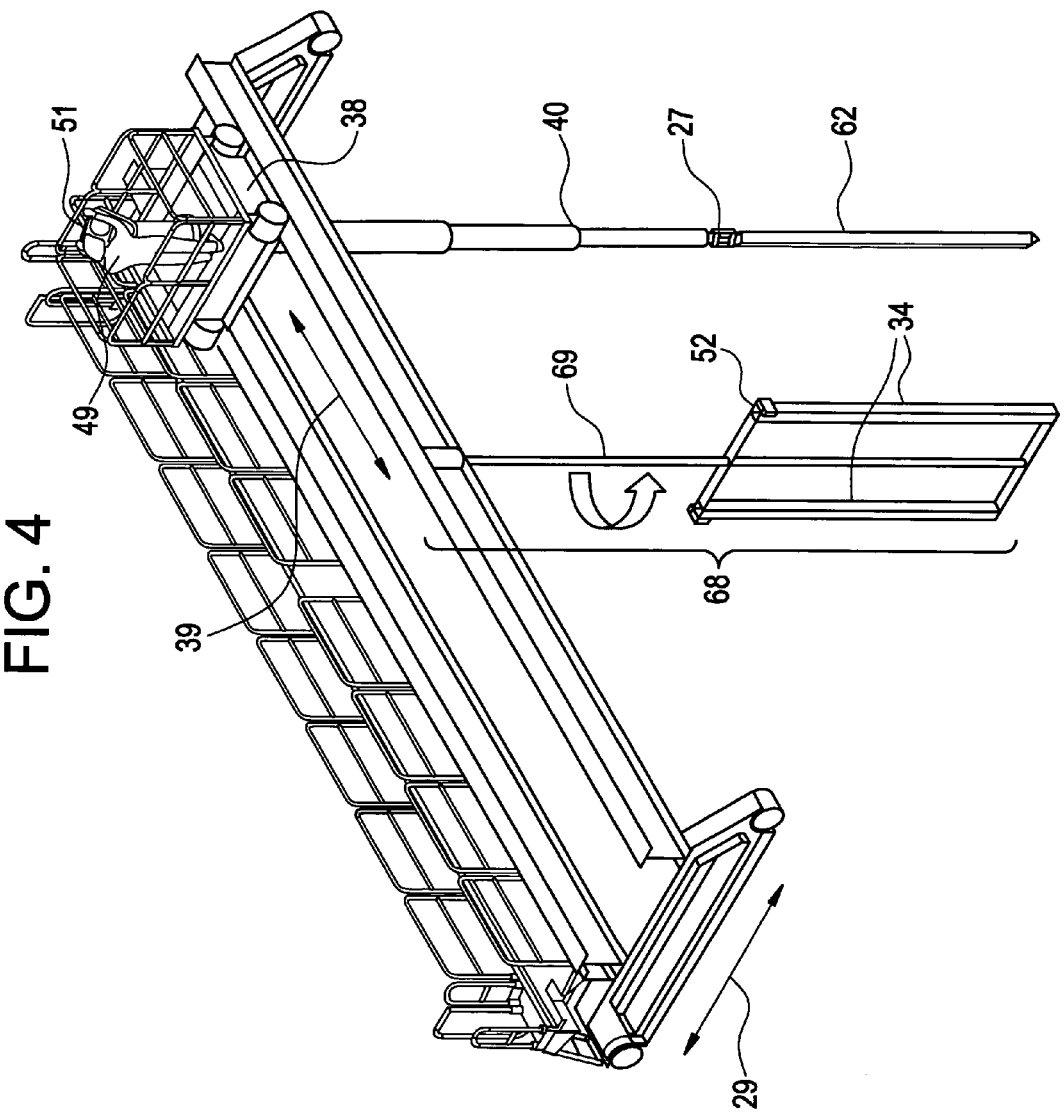
FIG. 4 is a perspective view of a fuel pool platform showing a fuel mast, fuel pool grapple and a rotating carousel for receiving and transferring fuel components during nuclear reactor refueling operations according to another exemplary embodiment.

FIG. 4 illustrates another embodiment of a fuel pool bridge 26 having a trolley 38 positioned over a fuel pool 24 for receiving spent core components from the reactor core 14 and transferring replacement core components to the reactor core 14. In the illustrated embodiment the core component 16 can be a fuel bundle. In this embodiment, trolley 38 has a telescoping mast 40 extending beneath trolley 38, the end segment of which includes a fuel bridge grapple 27 for engaging either a spent and/or a new fuel bundle. Substantially central-positioned along the trolley movement portion of the fuel pool bridge 26 in a fixed position and aligned with the center of transfer channel 32, the handover assembly 30 includes a carousel 68 configured and controlled to rotate about the carousel mast 69.

Compartments 34 are a fixed radial distance from the carousel mast and configured for receiving a fuel bundle 62 within each compartment 34. The fuel mast 40 can be configured for the fuel pool grapple 27 to engage and prevent a rotational movement of carousel 68 when a fuel bundle is aligned with the transfer channel 32 toward the reactor pool 18. When the fuel pool bridge has moved to its closest position to the fuel transfer channel the fuel bundle 62 can be accessible by the reactor pool grapple 36 beneath the reactor pool bridge and can be subsequently transferred to the reactor core as a replacement core component. Fuel compartments 34 of carousel 68 each have a latch 52 for retaining its inserted fuel bundle 62.

Figure 5:
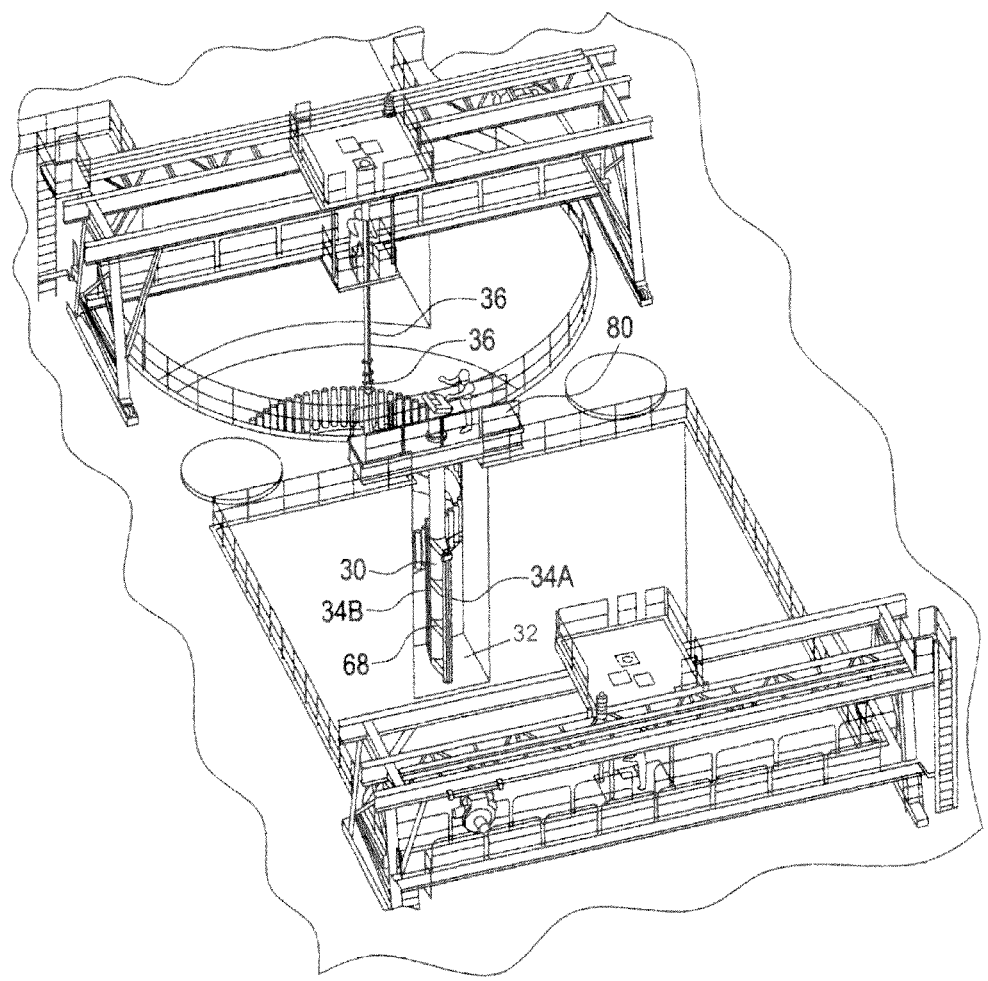
FIG. 5 is a perspective view of a nuclear reactor refueling infrastructure having a stationary transfer channel bridge and rotatable carousel positioned within a transfer channel pool for transferring core components between the reactor pool and the fuel pool during nuclear reactor refueling operations according to another exemplary embodiment.

FIG. 5 illustrates another embodiment of a handover assembly 30, wherein the handover assembly 30 extends downward within the transfer channel 32 from the center of a stationary transfer channel bridge 80 substantially central-positioned over transfer channel 32. In this embodiment both compartments 34 are initially empty and the fuel pool platform can be used to lift a fuel bundle 62 out of a fuel storage rack 89 within the fuel pool 24 and insert a new fuel bundle 62 into compartment 34A. At about the same time, reactor pool grapple 36 can retrieve a spent fuel bundle from the core and insert the spent fuel bundle into compartment 34B. Subsequent to loading both compartments 34, carousel 68 can be rotated 180 degrees within the transfer channel 32, reactor pool grapple 36 retrieves the replacement fuel bundle from compartment 34A, moves the replacement fuel bundle to the reactor core and inserts the replacement fuel bundle within the reactor core, replacing the spent fuel bundle. At about the same time, the fuel bridge grapple 27 can retrieve the spent fuel bundle and insert it into a storage rack for spent fuel (not shown). This procedure can be repeated multiple times, as required, to complete the refueling operation of the reactor core 14.

In some refueling assembly embodiment the stationary fuel transfer bridge can be moved to a nearby surface storage location when not in use, thus minimizing any potential contamination of the transfer channel 32 and fuel pool 24 caused by any surface corrosion of any carousel surface materials.

Figure 6:
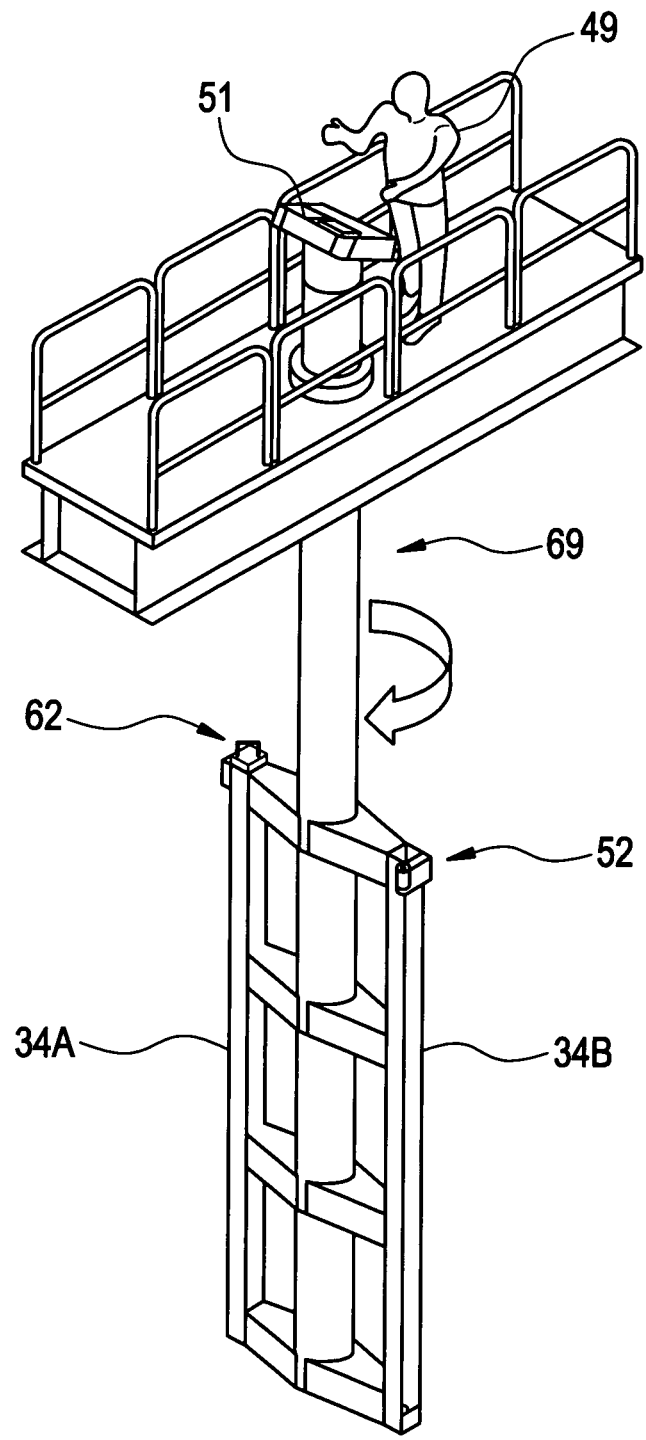
FIG. 6 is a close up perspective view of the stationary fuel transfer carousel of FIG. 5 showing the rotatable fuel transfer carousel handover assembly configured for receiving two fuel bundles in opposing compartments according to one exemplary embodiment.

The handover assembly 30 enables the reduction of time required to refuel a nuclear reactor 10, thus reducing the electricity generating downtime of a nuclear reactor 10 during refueling. FIG. 6 illustrates the stationary transfer channel bridge 80 and handover assembly 30 having a carousel 68 underneath. Operator 49 controls the rotational movement of the carousel 68 via control system 51 as well as the activation and deactivation of retention latches.

Figure 7:
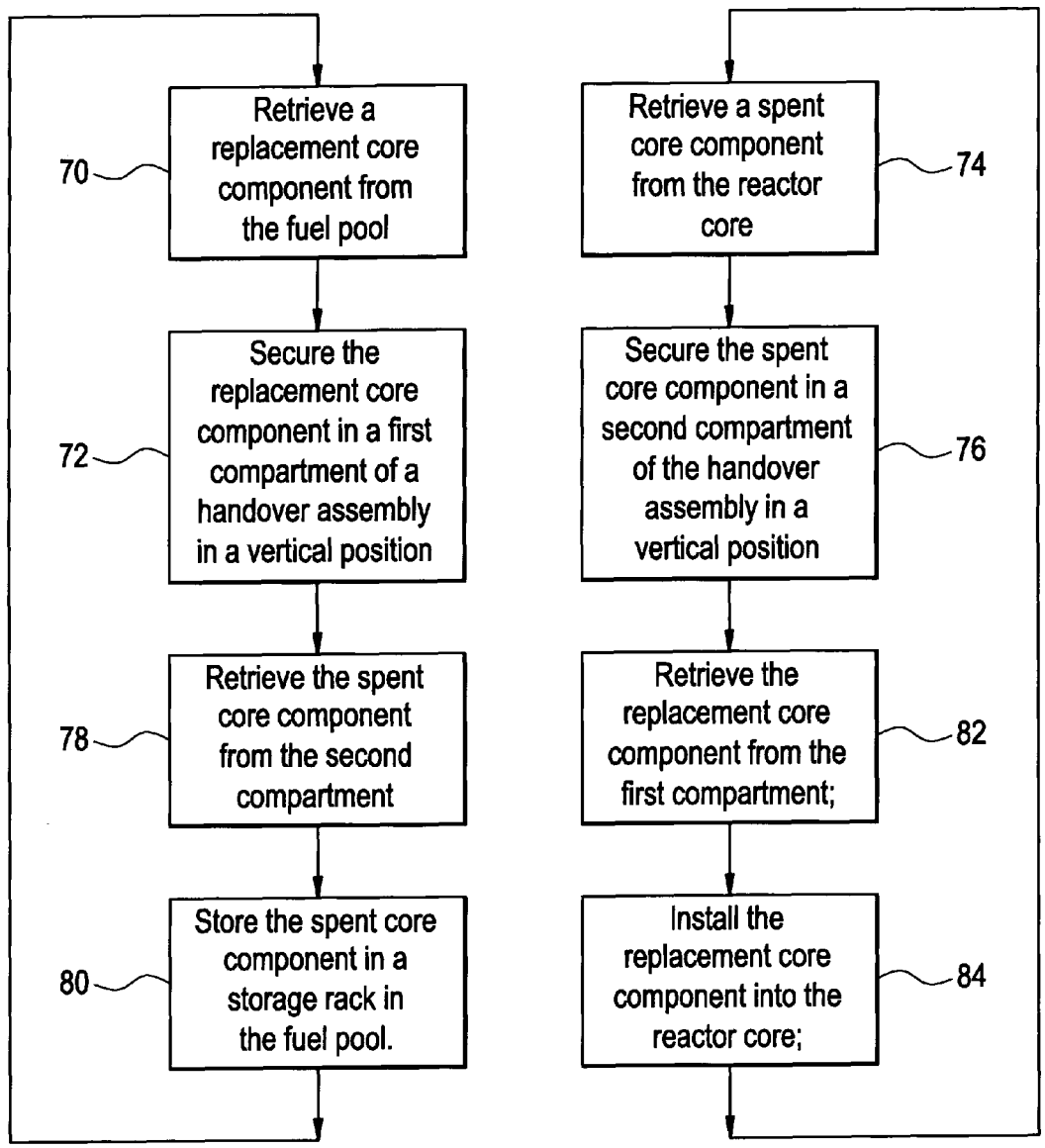
FIG. 7 is a flowchart for a method of refueling a nuclear reactor according to some exemplary embodiments.

FIG. 7 illustrates a method for refueling a nuclear reactor that includes retrieving a replacement core component from the fuel pool in process 70 and securing the replacement core component in a first compartment of a handover assembly in a vertical position in process 72. The method also includes retrieving a spent core component from the reactor core in process 74 and securing the spent core component in a second compartment of the handover assembly in a vertical position in process 76. Processes 74 and 76 can be performed nearly simultaneous to processes 70 and 72. The spent core component is retrieved from the second compartment in process 78 and is stored in a storage rack in the fuel pool in process 80. The replacement core component is retrieved from the first compartment in process 82 and is installed into the reactor core in process 84. The processes 82 and 84 can be performed nearly simultaneous to processes 78 and 80.

Additionally, while not shown in FIG. 7, the method can include transferring the retrieved spent core component towards the transfer channel following retrieving of the spent core component of process 74. The method also includes transferring the replacement core component towards the transfer channel following retrieving of the replacement core component of process 74. Again, each of these transferring processes can be about simultaneous.

As discussed above, the handover assembly can be rotatable within the transfer channel. The handover assembly can have an unoccupied first compartment positioned for receiving and securing the replacement core component and an unoccupied second compartment is positioned for receiving and securing the spent core component. In such embodiments, the method can include rotating the handover assembly to enable the retrieving of the replacement core component secured in the first compartment within the reactor pool and enable the retrieving of the spent core component secured in the second compartment within the fuel pool.

When describing elements or features and/or embodiments thereof, the articles "a", "an", "the", and "said" are intended to mean that there are one or more of the elements or features. The terms "comprising", "including", and "having" are intended to be inclusive and mean that there may be additional elements or features beyond those specifically described.

Those skilled in the art will recognize that various changes can be made to the exemplary embodiments and implementations described above without departing from the scope of the disclosure. Accordingly, all matter contained in the above description or shown in the accompanying drawings should be interpreted as illustrative and not in a limiting sense.

It is further to be understood that the processes or steps described herein are not to be construed as necessarily requiring their performance in the particular order discussed or illustrated. It is also to be understood that additional or alternative processes or steps may be employed.

What is claimed is:

1. An assembly for refueling a nuclear reactor having a reactor core including a plurality of elongated core components positioned in a reactor pool, a reactor pool bridge positioned above and movable over the reactor pool, a fuel pool, a fuel pool bridge positioned above and movable over the fuel pool, and a transfer pool fluidly coupling the fuel pool to the reactor pool, the assembly comprising:

a handover assembly selectively positionable within a transfer channel and having at least two compartments each configured for selectively securing one of the core components in a vertical position, the handover assembly being movable to allow a reactor pool grapple operating from the reactor pool bridge and a fuel pool grapple operating from the fuel pool bridge to each simultaneously retrieve a core component from one of the compartments wherein the handover assembly includes a mast with the compartments attached thereto, the mast and attached compartments rotatably coupled in a permanently fixed position about a lower portion of the fuel pool bridge and extending downward, the mast and compartments being substantially aligned with the transfer channel and dimensioned to enable at least a 90 degree rotation of the mast and the at least two compartments within the transfer channel.

2. The refueling assembly of claim 1, further comprising a trolley movably coupled about a portion of the fuel pool bridge, wherein the mast is coupled to the trolley and extends downward, the compartments being positioned about the mast and a lifting assembly configured to raise and lower the fuel pool grapple and a core component engaged by the fuel pool grapple.

3. The refueling assembly of claim 2 wherein the trolley includes an extension assembly configured to extend the handover assembly from the fuel pool bridge and the trolley and into the transfer channel.

4. The refueling assembly of claim 1, further comprising a hoist and a cable coupled to the fuel pool grapple and operable from the fuel pool bridge to raise and lower the fuel pool grapple and access each of the compartments, the fuel pool grapple being configured to temporarily secure a component and install and retrieve components from each of the compartments.

5. The refueling assembly of claim 1 wherein the handover assembly includes an elongated body extending downward and defining the at least two compartments each having an elongated shape, each compartment having at least one substantially open side for allowing the lateral passage of a component into and out of the compartment, and a latch to selectively laterally secure the core component vertically positioned within the compartment.

6. The refueling assembly of claim 5 wherein each compartment includes a bottom aperture and a bottom plate movable to selectively close the bottom aperture, the bottom plate being configured to hold the core component vertically within the compartment and movable to an open position to enable the core component to exit from the bottom aperture responsive to a remote command.

7. The refueling assembly of claim 1 wherein the handover assembly includes a first compartment for securing a first fuel assembly and a second compartment for securing a second fuel assembly.

8. The refueling assembly of claim 7 wherein the first and second compartments are positioned on a first side of the handover assembly, the handover assembly includes a third compartment positioned on a second side substantially opposing the first side and being configured to receive and secure a core component selected from the group consisting of a double blade guide, a control rod, and a control rod tube, wherein the handover assembly is rotatable to allow the independent selective access to each of the first, second and third compartments by the fuel pool grapple and the reactor pool grapple.

9. The refueling assembly of claim 1, further including a handover assembly control system configured to control an operation of the handover assembly.

10. The refueling assembly of claim 9 wherein the control system is configured to prevent a movement of the handover assembly through the transfer channel in a direction of the reactor pool when a leading compartment secures a core component.

11. The refueling assembly of claim 1, further comprising a transfer channel bridge positioned above the transfer channel, the handover assembly being rotatably coupled beneath the transfer channel bridge.

12. The refueling assembly of claim 11 wherein the transfer channel bridge is substantially fixed in position during refueling and removable when not in use.

13. The refueling assembly of claim 11 wherein the handover assembly includes only two compartments, a first compartment being positioned about 180 degrees and substantially apart from a second compartment.

14. An assembly for refueling a nuclear reactor having a reactor core in a reactor pool through a transfer channel to a storage rack in a fuel pool, the assembly comprising:
    a handover assembly having at least two compartments each configured to selectively secure at least one component of the core in a vertical position, the handover assembly being positionable within the transfer channel;
    a reactor pool bridge positioned above and movable over the reactor pool and including a reactor pool transfer assembly having the reactor pool grapple configured to engage a spent core component from the core and transfer the spent core component to at least one of the compartments of the handover assembly; and
    a fuel pool bridge positioned above and movable over the fuel pool and including a fuel pool transfer assembly having the fuel pool grapple configured to engage a replacement core component within the fuel pool and transfer the replacement core component from the fuel pool to at least one of the compartments of the handover assembly, a trolley movable along the fuel pool bridge perpendicular to the movement of the reactor pool bridge over the reactor pool, wherein the handover assembly is rotatably coupled beneath the trolley and wherein the trolley includes an extension assembly configured to extend the handover assembly from the fuel pool bridge and the trolley and into the transfer channel,
    the assembly being configured to allow the reactor pool grapple and the fuel pool grapple to each simultaneously retrieve a core component from one of the compartments.

15. The refueling assembly of claim 14 wherein the handover assembly includes an elongated body defining the at least two compartments, each compartment including a latch configured to laterally secure a core component vertically within the compartment, the latch being responsive to a remote instruction.

16. The refueling assembly of claim 15 wherein each compartment includes a bottom plate configured to vertically hold the core component within the compartment, the bottom plate being movable to enable the core component to selectively exit from a bottom aperture of the compartment.

17. The refueling assembly of claim 14 wherein the handover assembly includes a first compartment configured to secure a first fuel assembly and a second compartment configured to secure a second fuel assembly, wherein the first and second compartments are positioned on a first side of the handover assembly and wherein the handover assembly includes a third compartment positioned on a side substantially opposing the first side, the third compartment being configured to secure at least one of a double blade guide, a control rod, and a control rod tube, wherein the first compartment is positioned on a first side of the handover assembly and the second compartment is positioned on an opposing side and substantially apart from the first compartment.

18. The refueling assembly of claim 14, further including a handover assembly control system for controlling an operation of the handover assembly including restricting the movement of the handover assembly within the transfer channel when a compartment securing a core component is positioned in a direction towards the reactor pool.

19. An assembly for refueling nuclear reactor comprising:
- a handover assembly for transferring one or more elongated core components between a reactor core pool and a fuel pool through a transfer channel in a vertical position, the handover assembly including two or more compartments for temporarily securing two different core components each in a vertical position;
- a reactor pool bridge for moving at least one of the core components within the reactor core pool to deliver and retrieve the at least one core component from at least one of the compartments of the handover assembly; and
- a fuel pool bridge for moving at least one of the core components within the fuel pool to deliver and retrieve the at least one core component from at least one of the compartments of the handover assembly,
- wherein the assembly is configured to allow the reactor pool bridge and the fuel pool bridge to each simultaneously retrieve the respective core components from the compartments of the handover assembly.

\* \* \* \* \*